US007197459B1

(12) United States Patent
Harinarayan et al.

(10) Patent No.: US 7,197,459 B1
(45) Date of Patent: Mar. 27, 2007

(54) HYBRID MACHINE/HUMAN COMPUTING ARRANGEMENT

(75) Inventors: Venky Harinarayan, Mountain View, CA (US); Anand Rajaraman, Palo Alto, CA (US); Anand Ranganathan, Mountain View, CA (US)

(73) Assignee: Amazon Technologies, Inc., Incline Village, NV (US)

( * ) Notice: Subject to any disclaimer, the term of this patent is extended or adjusted under 35 U.S.C. 154(b) by 796 days.

(21) Appl. No.: 09/976,717

(22) Filed: Oct. 12, 2001

Related U.S. Application Data

(60) Provisional application No. 60/276,963, filed on Mar. 19, 2001.

(51) Int. Cl.
G10L 11/00 (2006.01)
G06Q 99/00 (2006.01)

(52) U.S. Cl. ................... 704/270.1; 704/270; 705/1

(58) Field of Classification Search ............... 707/3–6, 707/104.1; 382/311; 345/358
See application file for complete search history.

(56) References Cited

U.S. PATENT DOCUMENTS

| 5,400,248 | A | * | 3/1995 | Chisholm | 705/12 |
|---|---|---|---|---|---|
| 5,455,875 | A | * | 10/1995 | Chevion et al. | 382/311 |
| 5,465,308 | A | | 11/1995 | Hutcheson et al. | |
| 5,797,130 | A | * | 8/1998 | Nelson et al. | 705/11 |
| 5,805,745 | A | | 9/1998 | Graf | |
| 5,862,223 | A | * | 1/1999 | Walker et al. | 705/50 |
| 5,881,230 | A | * | 3/1999 | Christensen et al. | 709/203 |
| 5,960,404 | A | * | 9/1999 | Chaar et al. | 705/8 |
| 5,974,392 | A | * | 10/1999 | Endo | 705/8 |
| 6,181,343 | B1 | * | 1/2001 | Lyons | 715/850 |
| 6,181,909 | B1 | * | 1/2001 | Burstein et al. | 434/353 |
| 6,295,439 | B1 | * | 9/2001 | Bejar et al. | 434/350 |
| 6,338,042 | B1 | * | 1/2002 | Paizis | 705/11 |
| 6,678,714 | B1 | * | 1/2004 | Olapurath et al. | 718/104 |
| 6,751,351 | B2 | * | 6/2004 | Knowles et al. | 382/181 |
| 2002/0069235 | A1 | * | 6/2002 | Chen | 709/104 |
| 2002/0083079 | A1 | * | 6/2002 | Meier et al. | 707/104.1 |

OTHER PUBLICATIONS distributed.net, "The Organization", retrieved Jun. 8, 2005, from http://www.distributed.net/, pp. 1-2.
distributed.net, "distributed.net History & Timeline," retrieved Jun. 8, 2005, from http://www.distributed.net/history.php, pp. 1-7.
Gunn, S., "Hey, buddy, can you spare some cycles?," Sep. 24, 1997, retrieved Jun. 8, 2005, from http://www.cnn.com/TECH/9709/24/netly.news/, pp. 1-4.

(Continued)

*Primary Examiner*—David Hudspeth
*Assistant Examiner*—Brian L. Albertalli
(74) *Attorney, Agent, or Firm*—Seed IP Law Group PLLC

(57) ABSTRACT

A hybrid machine/human computing arrangement which advantageously involves humans to assist a computer to solve particular tasks, allowing the computer to solve the tasks more efficiently. In one embodiment, a computer system decomposes a task, such as, for example, image or speech comparison, into subtasks for human performance, and requests the performances. The computer system programmatically conveys the request to a central coordinating server of the hybrid machine/human computing arrangement, which in turn dispatches the subtasks to personal computers operated by the humans. The humans perform the subtasks and provide the results back to the server, which receives the responses, and generates a result for the task based at least in part on the results of the human performances.

85 Claims, 5 Drawing Sheets

OTHER PUBLICATIONS

Elance, Inc., "Elance History," retrieved Jun. 8, 2005, from http://www.elance.com/c/static/main/displayhtml.pl?file=heritage.html, pp. 1-3.

gonesilent.com homepage, Aug. 22, 2000, retrieved Jun. 8, 2005, from http://web.archive.org/web/20000822122731/www.gonesilent.com/about.html, pp. 1-2.

Fox, S., "Can New Technology Revolutionize the Net?," Jun. 1, 2000, retrieved Jun. 8, 2005, from http://web.archive.org/web/20001018221958/www.cnet.com/insider/0-121949-7-1995365.html, pp. 1-3.

Kana Inc., "Corporate Overview," retrieved Jun. 8, 2005, from http://www.kana.com/about/about.aspx, pp. 1-2.

Barlas, D., "Hipbone Connects to Kana," Jan. 5, 2004, retrieved Jun. 8, 2005, from http://www.line56.com/print/default.asp?ArticleID=5255, 1 page.

"What is Keen," retrieved Jun. 8, 2005, from http://www.keen.com/documents/homepage/wik_pop.asp?TID=gbFQnFLPstnUuFonMtBmHw, 1 page.

Ingenio, Inc., Ingenio™ homepage, retrieved Jun. 8, 2005, from http://www.ingenio.com/default.asp?TF=1, pp. 1-2.

Ingenio, Inc., Introducing Ingenio™ Pay Per Call™, retrieved Jun. 8, 2005, from http://www.ingenio.com/documents/corp/home.asp, pp. 1-2.

University of California, "What is SETI@home?," retrieved Jun. 8, 2005, from http://setiathome.ssl.berkeley.edu./, 2 pages.

Siebel Systems, Inc., Siebel homepage, retrieved Jun. 8, 2005, from http://www.siebel.com/, pp. 1-3.

\* cited by examiner

Figure 3a

```
302 /* Defines the various types of input */
    typedef enum {
        TEXT   = 0x1,
        SPEECH = 0x2,
    } junta_input_domains_t;

304 /* Defines the various output types */
    typedef enum {
        TEXT    = 0x1,
        NUMBERS = 0x2,
        TUPLES  = 0x4,
    } junta_output_domains_t;

306 /* A function maps an input to an output */
    typedef struct {
        junta_input_domains_t input;
        junta_output_domains_t output;
    } junta_function_s;

308 /* Create a new problem on the Junta Computer */
    junta_return_t junta_new_problem(junta_function_s function_type,
                        junta_id *problem_id);

310 /* The various attributes we might want to set on a problem */
    typedef enum {
        ACCURACY,
        SECURITY,
        TIMEOUT,
        MAXIMUM_TIME,
        COST_PER_TASK,
        MAXIMUM_COST,
    } junta_attribute_type_t;

312 /* The accuracy functions we have available right now */
    typedef enum {
        MAJORITY_WINS,
        SPECIFIC_ACCURACY,
        AT_LEAST_N,
    } junta_accuracy_functions_t;

314 /* The security levels we export for now */
    typedef enum {
        STRICT,
        LAX,
        NONE,
    } junta_security_levels_t;
```

Figure 3b

316 ␣ /* Specify the parameters for accuracy */
```
        typedef struct {
            junta_accuracy_functions_t function_type;
            union {
                struct {
                    int num_voters;
                } majority_wins;
                struct {
                    float probability;
                    float confidence;
                } specific_accuracy;
                struct {
                    int n;
                } at_least_n;
            } u;
        } junta_accuracy_s;
```

318 ␣ /* Specify the security parameters */
```
        typedef struct {
            junta_security_levels_t security_level;
        } junta_security_s;
```

320 ␣ /* All the attributes */
```
        typedef union {
            junta_accuracy_s accuracy;
            junta_security_s security;
            int timeout;
            int maximum_time;
            float cost_per_task;
            float max_cost;
        } junta_attribute_s;
```

322 ␣ /* Set some attributes on it */
```
        junta_return_t junta_set_attributes(junta_id problem_id,
                                    junta_attribute_type_t attribute_type,
                                    junta_attribute_s attributes);
```

324 ␣
```
        typedef union {
            char **text;
            void **speech_data;
        } junta_input_data_s;
```

326 ␣
```
        typedef union {
            int *numbers;
            char *text;
        } junta_output_data_s;
```

328 ␣ /* Supply the input values */
```
        junta_return_t junta_input(junta_id problem_id,
                            int input_id,
                            junta_input_data_s input);
```

330 ␣ /* Set the allowed range of output values */
```
        junta_return_t junta_set_output_values(junta_id problem_id,
                                    junta_output_data_s output);
```

332 ␣ /* Get the output for the input set specified. */
```
        junta_return_t junta_get_output(junta_id problem_id,
                                int input_id,
                                junta_output_data_s output);
```

US 7,197,459 B1

HYBRID MACHINE/HUMAN COMPUTING ARRANGEMENT

CROSS-REFERENCE TO RELATED APPLICATIONS

This non-provisional application claims priority to provisional application 60/276,963 filed Mar. 19, 2001, having the same title and inventorship as the present application. The specification of the above provisional application is incorporated herein by reference.

BACKGROUND OF THE INVENTION

1. Field of the Invention

The present invention pertains to the field of distributed computing. More specifically, the present invention relates to a new form of hybrid distributed computing involving one or more humans to assist a computer in solving a task, such as, for example, speech to text conversion, allowing the computer to solve the task in a more efficient manner.

2. Background Information

Traditional computers excel at tasks that are easily expressed by simple algorithms. For example, traditional word processing involves tasks that are easily expressed in terms of programming instructions that are machine executable. The instructions operate to handle user inputs in accordance with specific algorithms that represent the tasks that the computer will perform. For instance, when a text document is scanned by a word processor for spelling errors a computer processor executes specific instructions that result in verification whether user inputs conform to specific pre-determined character patterns, producing outputs to the user indicating where there are mismatches between user inputs and the pre-determined character patterns. There are many similar examples. In each, a computer processor uses simple algorithms to do the processing.

However, there are many tasks that are difficult for a computer processor to perform, even if many computer processors are combined in a distributed computer network or some other computer architecture. Such tasks include, among others, speech to text conversion, speech recognition, image comparison, and music comparison. While it may be a straightforward task for a human to describe the differences and similarities between two pictures, for example, automating the same task on a computer is overly complex and can appear insurmountable. There are a variety of reasons for this, but there tend to be three major underlying reasons. First, there is not an efficient way of representing human knowledge in a form that computers can understand and use. Second, existing algorithms for many of these tasks take so long to execute on a computer that the algorithms are rendered only marginally useful. Third, there is insufficient understanding as to how the human brain processes information to make it possible to easily transfer these processes to computers.

Finding solutions to these underlying issues has been the focus of artificial intelligence research for many years. However, research and development has been directed to improving the algorithms used by computer processors to complete various tasks the have been desirable but difficult to automate, increasing the performance capabilities of the computer processors themselves, and optimizing computer architectures by using multiple computer processors. While advances have been made, the three underlying issues above have not been satisfactorily addressed.

Thus, better methods and apparatuses are needed to help solve the type of problems that tend to be almost trivial for humans but difficult to automate using computers.

SUMMARY OF THE INVENTION

A hybrid machine/human computing arrangement including a central coordinating server and a number of human operated nodes, is provided to involve humans to assist a computer system to solve particular tasks, allowing the computer system to solve the tasks more efficiently.

In one embodiment, the computer system decomposes a task, such as, for example, image or speech comparison, into subtasks for human performance, and programmatically requests the performances, using an API of the present invention. In response, the central coordinating server dispatches the subtasks to personal computers operated by the humans, by way of e.g. the Internet.

The humans perform the requested subtasks and provide the results back to the central coordinating server. The central coordinating server receives the responses corresponding to human performance of the subtasks, and generates a result for the task based at least in part on the human performances of the subtasks.

BRIEF DESCRIPTION OF DRAWINGS

The present invention will be described by way of exemplary embodiments, but not limitations, illustrated in the accompanying drawings in which like references denote similar elements, and in which:

FIG. 3 illustrates one embodiment of the Application Programming Interface (API) associated with a hybrid machine/human computer.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well-known features are omitted or simplified in order not to obscure the present invention.

Parts of the description will be presented using terminology commonly employed by those skilled in the art to convey the substance of their work to others skilled in the art, such as node, server, client, and so forth. As well understood by those skilled in the art, this terminology is merely logical in nature to facilitate explanation of the present invention. Parts of the description will also be presented in terms of operations performed by a computer system, using terms such as network, text, data and the like. As well understood by those skilled in the art also, these quantities take the form of electrical, magnetic, or optical signals capable of being stored, transferred, combined, and otherwise manipulated through mechanical and electrical components of a digital system; and the term digital system includes general purpose as well as special purpose data processing machines, systems, and the like, that are standalone, adjunct or embedded.

Various operations will be described as multiple discrete steps performed in turn in a manner that is most helpful in understanding the present invention, however, the order of description should not be construed as to imply that these operations are necessarily performed in the order they are presented, or order dependent. Lastly, repeated usage of the phrase "in one embodiment" does not necessarily refer to the same embodiment, although it may.

Figure 1:
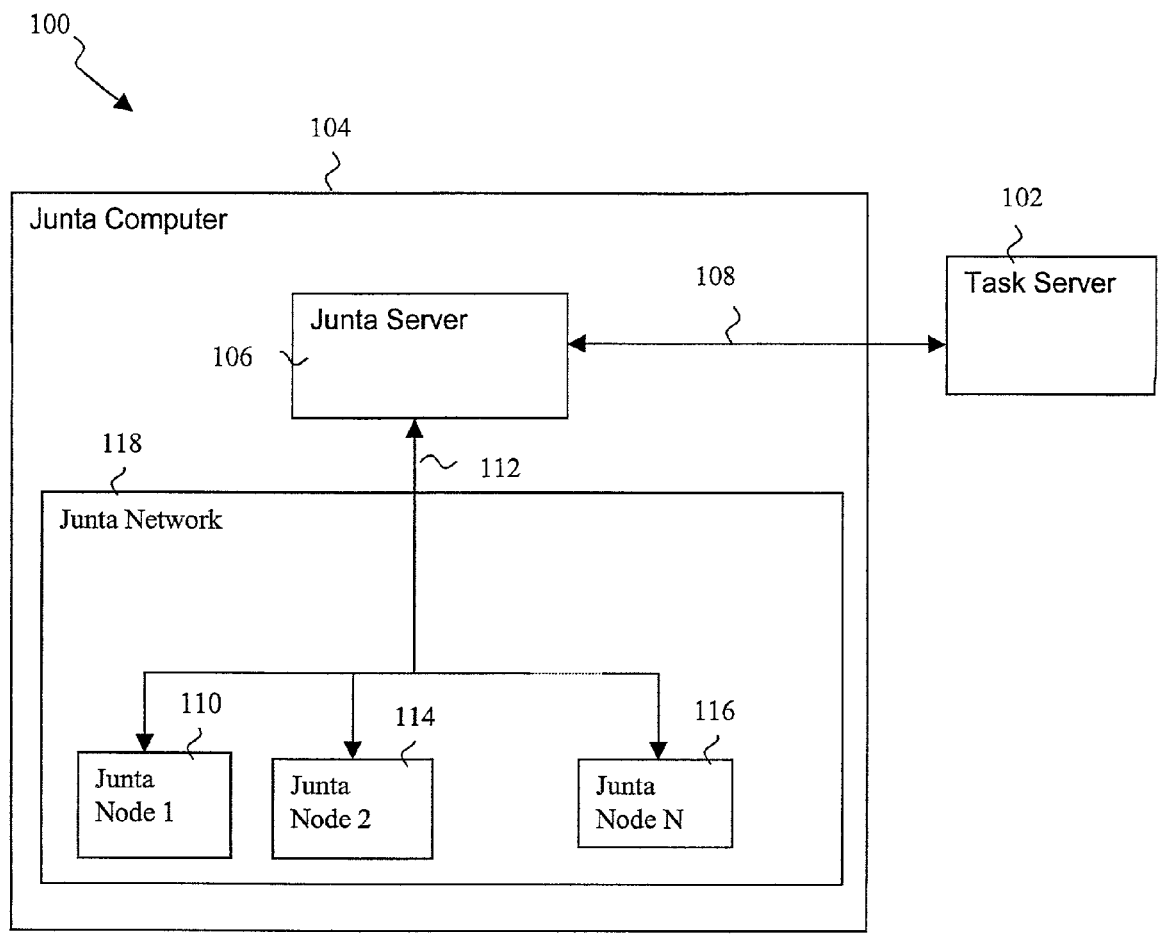
FIGS. 1–2 illustrate an overview of the present invention.
Figure 2:
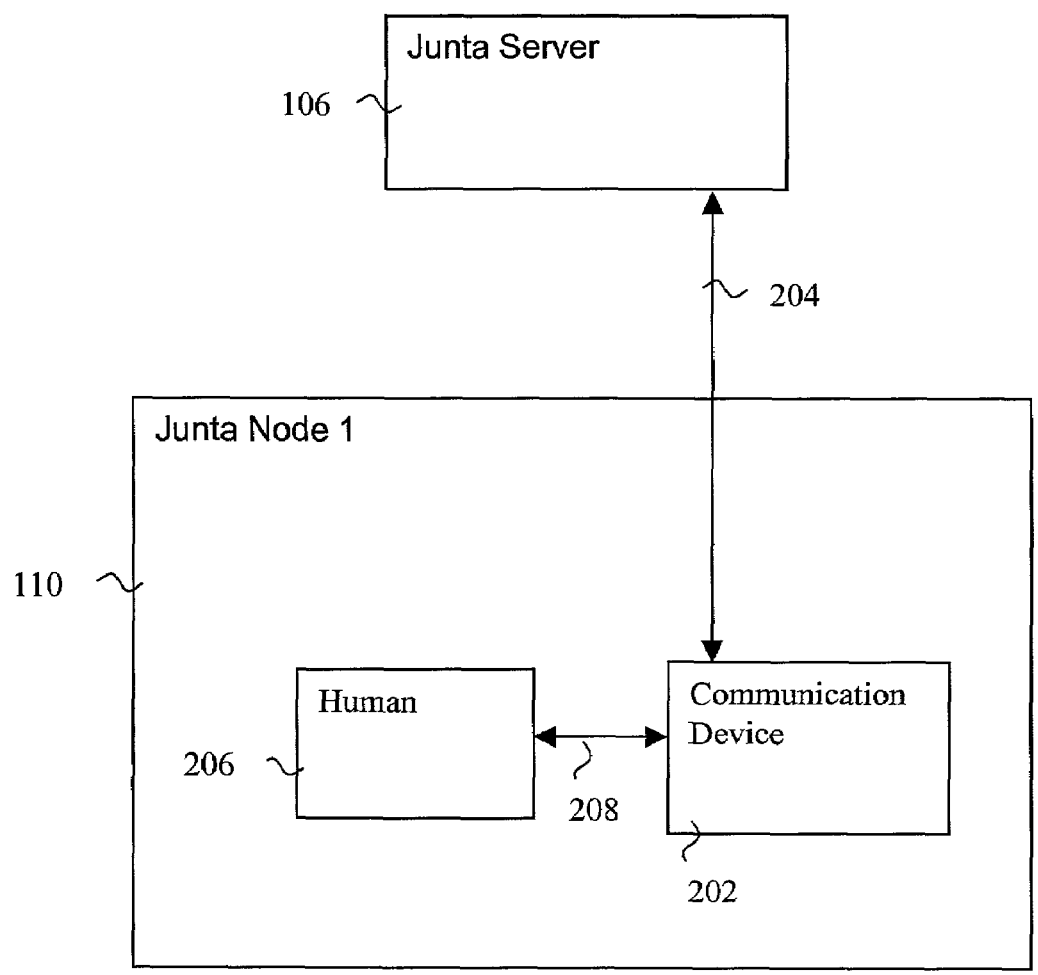

Referring now to FIGS. 1–2, an overview of the hybrid machine/human computer 100 of the present invention in accordance with one embodiment is shown. As illustrated, hybrid machine/human computer 100 comprises Task Server 102 associated with Junta Computer 104. For this embodiment, Junta Computer 104 is that portion of the hybrid machine/human computer that comprises functional components other than Task Server 102. In one embodiment, Task Server 102 resides at a remote premise accessible to a user wishing to utilize Junta Computer 104 to solve a problem or a task, by way of a networking fabric, such as the Internet. In an alternate embodiment, Task Server 102 is co-resident with the user. Task Server 102 is at the front end of a hybrid machine/human computer and functions to decompose the task to be performed into smaller, potentially many, subtasks to be performed by Junta Computer 104. As will be disclosed in greater detail below, the subtasks represent basic operations that any human can trivially perform without any special training or education. That is, the subtasks are generated in such a fashion as to be relatively simple for a human to perform as compared to a computer. Put another way, the task or problem is broken down into smaller sub-problems that may be easily solved by a human very rapidly, in almost no time at all. Examples of such subtasks or basic operations include, among others, classifying text into one of many categories, comparing music samples, comparing images, and converting speech into text. A more specific example of a subtask is the act of determining whether two images are photographs of the same person.

Decomposition of a task into subtasks may be performed manually by an operator of Task Server 102 or automatically by a task decomposition application (not shown) executing on Task Server 102. Such task decomposition application may decompose a task in any one of a number application dependant manner. Preferably, the manner in which such task decomposition decomposes a task is user configurable and/or selectable. That is, task decomposition application is equipped with a number of ways to decompose a task, and the user may specify which of the available options is to be employed. For example, in an example application of dispatching archive articles to humans for classification, the task decomposition application may decompose the tasks into subtasks by day ranges, month ranges or year ranges.

In accordance with one embodiment, Task Server 102 sends the subtasks to be performed to Junta Computer 104, whereby communication is directed to that functional portion of Junta Computer 104 called Junta Server 106. In one embodiment, communication link 108 is implemented using the Internet. In another embodiment, communication link 108 is implemented using a local area network such as Ethernet. In yet another embodiment, Task Server 102 and Junta Server 106 are in a single computer and share a common computer processor, in which case communication link 108 is a system bus, embedded in the common computer.

Those skilled in the art will appreciate that the functional components of the present invention can be implemented in many different embodiments. For example, Task Server 102 may be implemented as a single computer or as a collection of several distributed computers or, for a plurality of task servers, as multiple independent computers, each task server independently transacting with Junta Server 106 or using other system architectures. Likewise, Junta Server 106 may be implemented as a single computer or as a collection of distributed computers or using other system architectures.

Junta Server 106, as shown in FIG. 1, serves as the central coordinating computer of the Junta Computer 104. Junta Server 106 receives the subtasks from Task Server 102, determines the availability of Junta Node 1 110 to perform the subtask using network communications 112, and, if Junta Node 1 110 is available, sends the subtask to, and receives the resulting response from Junta Node 1 110 using network communications 112. Junta Server 106 similarly determines availability of other Junta Nodes such as Junta Node 2 114 through Junta Node n 116, where n is the $n^{th}$ Junta Node, and Junta Server 106 similarly sends each node a subtask and receives from each a corresponding response. Once Junta Server 106 receives a sufficient number of responses from Junta Network 118, which comprises the network of Junta Nodes, as shown, Junta Server 106 puts together all the responses collected and sends a result for the subtask back to Task Server 102, thereafter Task Server 102 is then enabled to solve the problem based on the solution received for each of the subtasks.

As an overview of a hybrid machine/human computer, the illustration of FIG. 1 is complemented with FIG. 2, which illustrates one embodiment of Junta Node 1 110 in closer detail and therein highlights a method of involving humans to assist a computer. As illustrated in FIG. 2, in accordance with one embodiment, Junta Server 106 communicates with Junta Node 1 110 through communication device 202 using network connection 204. Communication device 202 then interacts with human 206, wherein interaction 208 is text visually displayed by communication device 202 and alterable by human 206 using a keyboard or interaction 208 is sound projected from communication device 202 and text input by human 206 using a keyboard or interaction 208 is any output from communication device 202 and any input from human 206.

For example, in one embodiment, communication device 202 is a personal computer. Most personal computers provide for visual and audio outputs and human inputs using a keyboard, mouse, microphone, and so on. In another embodiment, communication device 202 is a handheld computing device such as a personal digital assistant (PDA) with visual outputs and only accepting inputs using a touch screen feature. In yet another embodiment, communication device 202 is a handheld communication device such as a cellular phone that allows for two-way audio, visual outputs, and keypad inputs. In one embodiment, network connection 204 is a cellular phone or Internet enhanced cellular phone network. In another embodiment, network connection 204 is the Internet. In yet another embodiment, network connection 204 is a combination of wireless local area network and Internet, to connect, for example, a PDA to a local area network with Internet access.

Even though FIG. 2 characterizes Junta Node 1 110 as having human 206 coupled with communication device 202, this need not be the case for Junta Node 2 114 through Junta Node n 116. In one embodiment, Junta Node 1 110 is as illustrated in FIG. 2 whereas Junta Node n 116 comprises a computer system whereby the computer system performs the subtask communicated from Junta Server 106. In another embodiment, Junta Node 1 110 follows as characterized in FIG. 2 whereas Junta Node n 116 comprises a human coupled with a computer whereby the computer system performs the subtask communicated from Junta Server 106.

As illustrated in FIG. 1, in one embodiment, Junta Server 106 is the intermediary between Task Server 102 and Junta Network 118. Junta Server 106 performs several functions, including, but not limited to: 1) coordinating availability of Junta Nodes comprising Junta Network 118; 2) verifying inputs received from Junta Nodes comprising Junta Network 118; 3) rating the power of Junta Computer 104; 4) calculating and disbursing payments to Junta Nodes comprising Junta Network 118; 5) maintaining records of transactions, transactions with Task Server 102, other task servers, and individual Junta Nodes; 6) storing data associated with Task Server 102, other task servers, and individual Junta Nodes comprising Junta Network 118; and 7) other miscellaneous book keeping activities.

In coordinating availability of Junta Nodes, Junta Server 106 keeps track of all Junta Nodes that have registered with Junta Server 106 as being available to perform subtasks. Registration may be facilitated in any one of a number of registration techniques known in the art. Upon registering, in accordance with one embodiment, each Junta Node provides additional capabilities, such as, for example, language spoken. Junta Server 106 identifies the Junta Nodes that have registered and fit within the scope of particular subtasks, such as, for instance, language spoken. Those Junta Nodes registered and that meets minimum basic prerequisites, comprise Junta Network 118. In other words, the collection of Junta Nodes employed to solve one task may be different from that of another task. Junta Server 106 sends each Junta Node in Junta Network 118 choices of subtasks available for performance and the compensation associated with each subtask. Alternate embodiments allow for different combinations as to the type of choices offered to Junta Network 118. In one embodiment, each Junta Node in Junta Network 118 is able to choose which subtasks are to be performed, making such choices considering relevant data such as compensation level offered for performance of each subtask.

Communications between Junta Server 106 and the Junta Nodes may be conducted using any one of a number of known client-server communication techniques. For example, in one implementation, Junta Nodes may be equipped with a generic browser, whereas Junta Server 106 may include a web server, where communication between Junta Server 106 and Junta Nodes may be conducted via web pages.

In verifying inputs received from Junta Nodes, Junta Server 106 collates the responses received from Junta Nodes in Junta Network 118 responding to the same subtask. In one embodiment, Junta Server 106 uses a simple algorithm that determines the correct solution to be that solution which is most popular, wherein the "majority wins" (also referred to as "majority governs", that is the result provided by the most number of Junta Nodes is determined to be the correct answer for the task, or an algorithm that determines the correct answer using Junta Node responses weighted according to the history of each particular Junta Node in coming up with the right answer previously, effectively weighting each Junta Node response by an accuracy rating for that Junta Node. Additionally, the final answer may be generated in accordance with a "specific accuracy," using e.g. an algorithm selecting a solution that represents "at least N" Junta Node responses in agreement, where N is the integer number of responses in agreement (assuming the subtask has been dispatched to M Junta nodes for performance, where M is greater than N).

In rating the power of Junta Computer 104, in accordance with one embodiment, Junta Server 106 bases its power rating on the number of registered Junta Nodes participating in the Junta Computer, along with other adjustments for Junta Node capability, Junta Node historical accuracy or accuracy rating, and so forth. The power rating represents the computing power available from Junta Computer 104 for the particular subtask being considered. This is analogous to the FLOP rating or clock speed used to rate traditional computers.

In one embodiment, Junta Server 106 also calculates the compensations for the Junta Nodes. In accordance with one embodiment, Junta Server 106 determines the compensation due and disbursement method for each Junta Node participating in Junta Computer 104, taking into consideration data for each Junta Node, such as cumulative contribution to Junta Computer 104, quality of the work contributed, and other parameters agreed to between Junta Server 106, the particular Junta Node involved, and Task Server 102 or the particular task server involved.

In maintaining records of transactions, Task Server 102, in accordance with one embodiment, uses database or data storage features to catalog and maintain transaction data associated with Task Server 102, other task servers, and all individual Junta Nodes.

Regarding handling other miscellaneous book keeping activities, Junta Server 106, in one embodiment, records data relevant to security and privacy and performance measures, such as, for instance, throughput, latency and accuracy. Junta Server 106, in one embodiment, stores such performance data as throughput, defined as the number of subtasks completed by Junta Computer 104 in a unit time, latency, defined as how long it would take to obtain the solution to a subtask once it has been submitted to Junta Computer 104, and accuracy, defined as an accuracy rating for Junta Computer 104 as a whole rather than accuracy ratings for Junta Nodes, also tracked and maintained by Junta Server 106.

Regarding security and privacy, Junta Server 106, may, in one instance, receive data from Task Server 102 indicating Task Server 102 requests no special security or privacy for one task yet desires low level or lax security and privacy protection for another task. Such low level protection includes, in accordance with one embodiment, Junta Server 106 ensuring that only relevant data is passed from Task Server 102 to Junta Computer 104. For example, if Task Server 102 wishes to use Junta Computer 104 to clean certain fields in a database containing sensitive information, only the data containing the fields to be cleaned are sent to Junta Computer 104. Should Task Server 102 desire strict security or higher-level protection, Junta Server 106, in accordance with one embodiment, uses Secure Sockets Layer (SSL) for all communication with Junta Network 118 using network 112.

The aforementioned functions of Junta Server 106 are enabled by algorithms, programming instructions, and data in accordance with an Application Programming Interface (API). A permanent copy of the programming instructions to practice the present invention, in one embodiment, may be loaded into non-volatile storage associated with Junta Server 106, Task Server 102, similar task servers, or any computer system associated with Junta Computer 104 in a factory, or in the field, through distribution source/medium such as tapes, CDROM, DVD, and so forth, and through network connection 112 or network connection 108.

The Application Programming Interface (API), in one embodiment, provide facilities to enable Task Server 102 to programmatically describe to Junta Server 106, selected details of the task to be solved, e.g. the nature of the task at hand, the input data associated with the task to be performed, the accuracy expected of the results that are sent back, the desired security level, the maximum amount of time to be spent for a subtask, the cost to be incurred for a task, and so forth. The API also provides for facilities to enable return communication from Junta Server 106 to Task Server 102.

Effective communications and interactions involving the various systems and sub-systems associated with hybrid machine/human computer 100 require an API that establishes certain ground rules and protocols. FIGS. 3*a*–3*b* provide the essential aspects of an API in a C like programming language, in accordance with one embodiment.

For the embodiment, the API provides for various data types. Typedef declarations 302, 304, 306, 324 and 326 provide for the establishment of the data types junta_input_domains_t, junta_output_domains_t, junta_function_s, junta_input_data_s, and junta_output_data_s, respectively, for various declared variables and data structures. Variables/data structures of these types may assume one of the enumerated/defined data values. That is, variables of the type junta_input_domains_t may assume "text" or "speech", whereas variables of the type junta_output_domains_t may assume "text", "numbers", and "tuples", specifying the nature of the input and output data. Data structures of the type junta_function_s comprise data of variables with the types junta_input_domains_t and junta_output_domains_t. Data for the variables of type junta_input_data_s and junta_output_data_s are specified by the pointers pointed to by pointers "*text" and "*speech data", and pointers "*numbers" and "*text" respectively. Together, these data types junta_input_domains_t, junta_output_domains_t, junta_function_s, junta_input_data_s and junta_output data_s facilitate programmatic communication between Task Server 102 and Junta Server 106 on input and output data, including their types, for a problem to be solved by Junta Computer 100. In alternate embodiments, additional input and output data types, such as video, may also be defined and supported.

Additionally, for the embodiment, typedef declarations 310, 312, 314, 316, 318, and 320 provide for the establishment of the data types junta_attribute_type_t, junta_accuracy_functions_t, junta_security_level_t, junta_accuracy_s, junta_security_s, and junta_attribute_s respectively, for various declared variables and data structures. Variables and data structures of these types may assume one of the enumerated/defined data values. That is, variables of the type junta_attribute_type_t may assume "ACCURACY", "SECURITY", and so forth. Variables of the type junta_accuracy_function_t may assume "MAJORITY_WINs", "SPECIFIC_ACCURACY", and so forth, whereas variables of the type junta_security_level_t may assume "STRICT", "LAX", and so forth. Variables/data structures of the types junta_accuracy_s, junta_security_s, and junta_attribute_s may take on the accuracy, security and consolidated attribute values correspondingly as defined. Together, these data types junta_attribute_type_t, junta_accuracy_functions_t, junta_security_level_t, junta_accuracy_s, junta_security_s, and junta_attribute_s facilitate programmatic communication between Task Server 102 and Junta Server 106 on various attributes, such as security, accuracy and so forth, for a problem to be solved by Junta Computer 100. In alternate embodiments, additional attribute types and/or attributes may be supported.

For the embodiment, the API also includes function junta_new_problem 308 to facilitate Task Server 102 to request Junta Server 106 to create a new task to be performed or a new problem to be solved. Among the invocation parameters is the parameter "function_type" having the earlier described data type junta_function_s, and the parameter identified by pointer "*problem_id" having the data type junta_id. Returned data for the "create" request, such as status, may be found in junta_return_t.

The API also includes function junta_set_attributes 322 to facilitate Task Server 102 to specify for Junta Server 106 the various attributes associated with a task to be performed or a problem to be solved. In addition to the task/problem identifier "problem_id", the invocation parameters include "attribute_type" and "attributes" (having data types junta_attribute_type_t and junta_attribute_s respectively).

Further, the API also includes functions junta_input 328 and junta_set_output 330 to facilitate Task Server 102 to provide and specify for Junta Server 106 the input data and the range of the output data associated with a task to be performed or a problem to be solved. The API also includes function junta_get_output 332 to facilitate Task Server 102 to retrieve from Junta Server 106 the output data for a task performed or a problem solved. In the case of junta_input 328, in addition to the task/problem identifier "problem_id", the invocation parameters include the input data "input" (with the data type junta_input_data_s). In the cases of junta_set_output 330 and junta_get_output 332, in addition to the task/problem identifier "problem_id", the invocation parameters include the output data "output" (with the data type junta_output_data_s).

Figure 4:
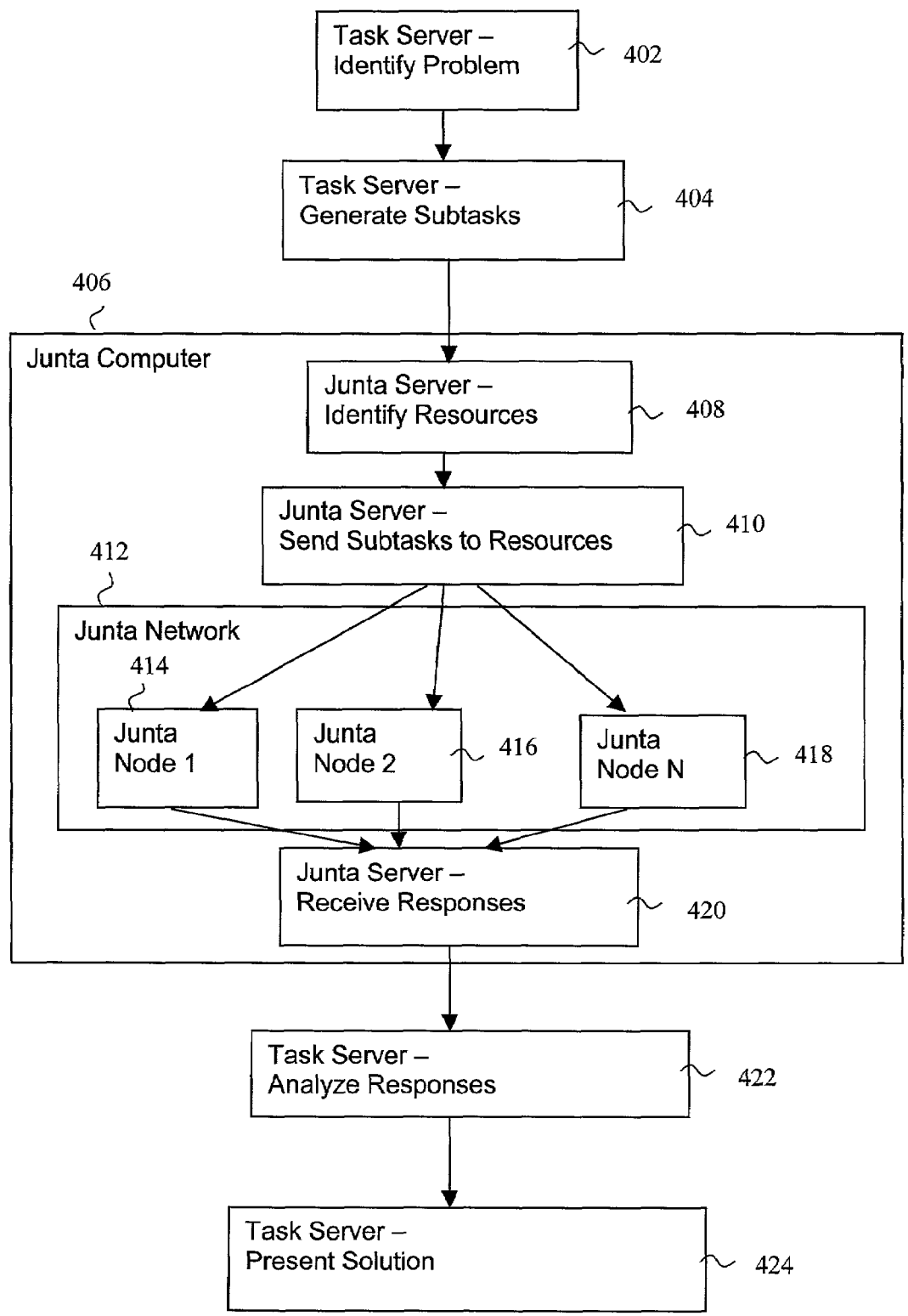
FIG. 4 illustrates the operational flow for a Junta Computer in accordance with one embodiment.

Next, FIG. 4 illustrates an operational flow of a hybrid machine/human computer arrangement in accordance with one embodiment. First is task server identification of the problem 402, followed by task server generation of subtasks 404. Moving to the functions handled by Junta Computer 406, Junta Server identifies resources 408 needed by Junta Computer 406. For examples, the task on hand requires French speaking humans, and Task Server has requested that each subtask be performed by at least 10 humans with a past accuracy record of at least 90%, Junta Server identifies the Junta Nodes meeting the criteria accordingly. If more Junta Nodes are available than the number Junta Nodes needed, the subtask may be assigned randomly, or by some fairness algorithm, ensuring most Junta Nodes of equal quality/accuracy are given substantially the same amount of work.

Upon identifying the Junta Nodes to be assigned to subtasks, Junta Server then sends subtasks to each of the identified resources (Junta Nodes) 410, those resources comprising Junta Network 412. Junta Node 1 414, Junta Node 2 416, through Junta Node n 418, which are the Junta Nodes comprising Junta Network 412, each perform their respective assigned subtasks.

Upon completing performance of the assigned subtasks, each of the Junta Nodes sends the result or results back to the Junta Server. Junta Server, in due course, receives all responses 420 from the Junta Nodes comprising Junta Network 412. Thereafter, Junta Server compares and analyzes the responses, and determines/synthesizes the result for the task. As described, the comparisons, analyses as well as syntheses may take into consideration the accuracy desired, as well as past accuracy of the Junta Nodes providing the answers.

Finally, upon deriving an answer for the requested task, Junta Server returns the derived solution to the Task Server As an example application using the operational flow in FIG. 4, consider a task involving the comparison of images. First, the task server identifies the problem 402 that needs to be solved by Junta Computer 406. Next, the task server generates subtasks 404. For this example, consider that one specific subtask is the comparison of two image files, requiring a determination whether a certain individual pictured in one image file is the same person pictured in the other image file. Once subtasks have been generated, these subtasks are sent to the Junta Computer 406 via the Junta Sever. In this example, the communication from task server to Junta Server as well as from Junta Server to individual Junta Nodes is in the form of electronic mail messages containing attachments for the image files. The Junta Server then identifies the resources 408 available to complete the subtasks. For example, the Junta Server might reference a data base containing information about Junta Nodes that have previously expressed interests in image comparison subtasks and have previously agreed to certain arrangements regarding level of compensation, timing for receiving new subtasks and providing responses back to the Junta Server, logistics such as receiving subtasks and providing responses using electronic mail, and so forth.

After resources are identified 408, the Junta Server sends the same subtask to n different Junta Nodes, wherein the number of Junta Nodes, n, is determined when the problem was identified by the task server 402. For example, it might be desirable for "at least n" Junta Nodes to produce the same result in order for a solution to be considered valid. This is an accuracy attribute identified by the task server 402. To make sure that at least n solutions in agreement are received, the Junta Server will need to keep sending subtasks to Junta Network 412 until at least n solutions are received 420. Each Junta Node receives an email with image attachments, opens the attachments, determines whether the two images contain the specified individual, and replies to the Junta Server using an electronic mail message. Once at least n solutions in agreement are received, the responses are sent to the task server for analysis 422. Lastly, once analysis is complete, the task server presents a solution to the subtask.

The above example using electronic mail messages sent out by the Junta Server to the Junta Nodes is an example of a push system. That is, the Junta Server pushes the subtasks out to the Junta Nodes, using the electronic mail messages sent to request action from the Junta Nodes comprising the Junta Network.

In contrast, a pull system can be implemented, in one embodiment, by establishing queues of subtasks residing at the Junta Server, awaiting performance by Junta Nodes that access the Junta Server to query whether subtasks are available to be performed. That is, the Junta Server pulls the Junta Nodes into the Junta Server environment to find subtasks to be performed. For example, a pull system might be implemented using a website on the Internet, the website representing the Junta Server, where Junta Nodes can access the website using dial up or whatever Internet access is available, query the Junta Server for available subtasks and relevant compensation and other arrangements, and provide responses to subtasks using the Internet website.

Thus, a hybrid machine/human computing arrangement has been described. While the present invention has been described in terms of the above-illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A method for a computer system to use human assistance in performing tasks, the method comprising:
  automatically and under control of a first computer system, causing a task to be performed by,
    identifying a first and a second subtask of the task, wherein the first subtask involves speech recognition;
    retrieving information about past quality of results of one or more humans when previously performing subtasks other than the first subtask;
    using the retrieved past quality information to facilitate performance of the first subtask by one or more humans, the facilitating of the performance of the first subtask including,
      identifying one or more required capabilities for performance of the first subtask;
      dispatching the first subtask to a remote second computer system of a first human for performance by the first human, the first human identified as being one of one or more humans who have capabilities that satisfy the required capabilities for the first subtask, the retrieved past quality information including past quality information for the first human when previously performing multiple subtasks other than the first subtask, the past quality information for the first human being at least part of the capabilities of the first human that satisfy the required capabilities for the first subtask; and
      receiving a first result from the first human via the second computer system, the first result generated by performance of the first subtask by the first human;
    providing payment to the first human for the performance of the first subtask; and
    generating a result for the task based at least in part on the first result.

2. The method of claim 1 wherein the identifying by the first computer system of the first and second subtasks of the task includes decomposing the task into at least the first and second subtasks.

3. The method of claim 1, wherein
  the method further comprises the first computer system dispatching said second subtask to a third computer system of a second human for performance by the second human, and the first computer system receiving a second result from the second human via the third computer system for said second subtask; and
  the first computer system further bases its generation of the result for said task on said second result.

4. The method of claim 3, wherein
  said task further comprising a third subtask, and the method further comprises the first computer system receiving and performing said third subtask producing a third result; and
  the first computer system further bases its generation of the result for said task on said third result.

5. The method of claim 1, wherein
  the method further comprises the first computer system performing said second subtask producing a second result; and
  the first computer system further bases its generation of the result for said task on said second result.

6. The method of claim 1, wherein said first human is one of college educated, at most high school educated, at most elementary school educated, and not formally educated.

7. The method of claim 1, wherein said subtask is one of text, speech, sound, and images related operations.

8. The method of claim 1, wherein said result is one of text, numbers, tuples, and sound.

9. The method of claim 1, wherein said task is one of text classification, image comparison, image processing, speech comparison, speech recognition, conversion of speech into text, and comparison of music samples.

10. The method of claim 1, wherein said task is associated with multiple attributes related to performance of said task, the attributes including an accuracy attribute, a security attribute, a timeout attribute, a maximum time spent attribute, a maximum cost per task attribute, and a maximum total cost attribute, and wherein the identifying of the one or more humans, the dispatching of the first subtask, and the generating of the result for said task are performed in a manner to reflect the multiple associated attributes.

11. The method of claim 1, wherein said task is associated with one or more attributes, and said attributes include an accuracy attribute.

12. The method of claim 1, wherein said task is associated with one or more attributes including a security attribute, and said security attribute comprises a selection of one of a "strict" security level, a "lax" security level, and "no" security level.

13. The method of claim 1, wherein said task is associated with one or more attributes that include a "maximum time" attribute specifying a maximum amount of time to be spent by an assigned human to perform said first subtask.

14. The method of claim 1, wherein said task is associated with one or more attributes, and said attributes include a maximum cost per task attribute.

15. The method of claim 1, wherein said task is associated with one or more attributes, and said attributes include a maximum total task cost attribute.

16. The method of claim 1 wherein the first computer system is a task server system that is part of a distributed hybrid computer/human computation arrangement, and wherein the first human is one of numerous humans remote from the task server system who each use distinct client computing devices to act as nodes of the distributed hybrid computer/human computation system.

17. The method of claim 16 wherein the distributed hybrid computer/human computation arrangement further includes one or more distinct coordinating server computing systems remote from the task server system such that the dispatching of the first subtask by the task server system includes sending information to at least one of the coordinating server computing systems that includes an indication of the first subtask and of the identified required capabilities, and wherein one of the coordinating server computing systems coordinates performance of the first subtask by identifying the first human as having capabilities that satisfy the identified required capabilities and by sending to the second computer system of the first human an indication of the first subtask to be performed.

18. The method of claim 1 wherein the first computer system is a coordinating server computing system that identifies the first and second subtasks of the task by receiving information about the first and second subtasks from a remote task server system, wherein the coordinating server computing system causes the result to be generated for the task based at least in part on the first result by sending the received first result to the remote task server system, and wherein the first human is one of numerous humans who each use distinct client computing devices to act as nodes available to the coordinating server computing system.

19. The method of claim 1 wherein the dispatching by the first computer system of the first subtask to the remote second computer system is performed using a defined application programming interface ("API").

20. The method of claim 1 wherein the dispatching by the first computer system of the first subtask to the remote second computer system is performed by programmatically sending one or more messages from the first computer system to the remote second computer system.

21. The method of claim 1 wherein the dispatching by the first computer system of the first subtask to the remote second computer system of the first human includes providing an indication to the first human of the payment to be provided for performance of the first subtask if the first human chooses to perform the first subtask.

22. The method of claim 1 wherein the providing of the payment to the first human is performed in response to the receiving from the first human of the first result from the performance of the first subtask.

23. The method of claim 1 wherein the required capabilities of the human for performance of the first subtask include an ability to speak a specified language.

24. The method of claim 1 wherein the required capabilities of the human for performance of the first subtask include an ability to hear.

25. The method of claim 1 wherein the required capabilities of the human for performance of the first subtask include a specified degree of historical accuracy by the human when performing subtasks.

26. The method of claim 1 wherein the payment provided to the first human for the performance of the first subtask is further based in part on quality of the performance of the first subtask.

27. The method of claim 1 wherein the payment provided to the first human for the performance of the first subtask is further based in part on cumulative contributions of the first human.

28. The method of claim 1 wherein the payment provided to the first human for the performance of the first subtask is further based in part on a prior agreement with the first human.

29. The method of claim 1 wherein the first compensation level is a first monetary amount, and wherein an amount of the payment provided to the first human for the performance of the first subtask is the first monetary amount.

30. The method of claim 29 wherein the second subtask has a distinct second monetary amount of compensation associated with performance of the second subtask, and wherein the method further comprises providing payment of the second monetary amount of compensation to a second human for performance of the second subtask.

31. The method of claim 1 wherein the past quality information for the first human when previously performing subtasks other than the first subtask reflects a past accuracy of the first human in performing those other subtasks.

32. The method of claim 31 further comprising, after the receiving of the first result from the first human, determining an accuracy of the first result and updating the past accuracy information for the first human to reflect the determined accuracy.

33. The method of claim 32 wherein the determining of the accuracy of the first result includes obtaining one or more results that are each generated by performance of the first subtask by a human other than the first human, and using the obtained one or more results as part of the determining of the accuracy of the first result.

34. The method of claim 33 wherein the using of the obtained one or more results as part of the determining of the accuracy of the first result includes weighting each of the obtained one or more results based at least in part on retrieved past accuracy information for the human whose performance generated the result.

35. The method of claim 1 wherein the generating of the result for the task is based at least in part on the past quality information for the first human.

36. The method of claim 1 wherein the payment provided to the first human is based at least in part on the past quality information for the first human.

37. The method of claim 1 wherein the dispatching of the first subtask to the remote second computer system of the first human includes providing an indication to the first human of compensation associated with performance of the first subtask.

38. The method of claim 1 wherein the payment provided to the first human is based at least in part on quality of the first result.

39. The method of claim 1 wherein the first human has at most an average level of skill with respect to performing the first subtask.

40. The method of claim 1 wherein the first human is not an expert with respect to performing the first subtask.

41. The method of claim 1 wherein the first subtask involves an activity that is straightforward for a typical human but is difficult for a computer system.

42. A method for a computing system to use human assistance in performing tasks, the method comprising:
receiving an indication of a first subtask to be performed, the first subtask having one or more associated criteria related to performance, wherein the first subtask involves conversion of speech into text;
sending an indication of the first subtask to multiple humans to each perform the first subtask, each of the humans being identified as being capable of satisfying at least some of the associated criteria for the first subtask;
from each of at least some of the multiple humans, receiving a result of performance of the first subtask by the human; and
automatically facilitating generation of a final result for the first subtask by,
determining that the received results include a common result that was received from each of a selected number of humans, the selected number of humans being greater than 1 and based on at least one of a majority of the at least some humans and of at least a specified number N of two or more humans; and
selecting the common received result as the final result for the first subtask.

43. The method of claim 42 further comprising tracking accuracy of the at least some humans based at least in part on whether a result received from a human is the common result.

44. The method of claim 42 wherein the first subtask is part of a task, and wherein the method further comprises automatically generating a result for the task based at least in part on the selected result for the first subtask and on the accuracy of the at least some humans who provided the selected result.

45. The method of claim 44 wherein the receiving of the indication of the first subtask includes automatically decomposing the task into at least the first subtask and a second subtask.

46. The method of claim 42 wherein the first subtask further has associated compensation for performance of the first subtask, and wherein the method further comprises facilitating providing of the associated compensation to one or more of the humans who provided the common result.

47. The method of claim 42 wherein the multiple humans to whom the indication of the first subtask is sent include a number N1 of the multiple humans, such that N and N1 are integers and N1 is greater than N.

48. The method of claim 42 wherein the at least some humans from whom the results of performance of the first subtask are received include a number N1 of multiple humans, such that N and N1 are integers and N1 is greater than N.

49. The method of claim 42 wherein the facilitating of the generation of the final result for the first subtask includes generating the final result so as to have a desired accuracy by automatically determining the selected number of humans for that desired accuracy.

50. The method of claim 42 wherein the receiving of the indication of the first subtask includes receiving an indication of a desired accuracy for the final result, and wherein the facilitating of the generation of the final result is performed such that the final result has the indicated desired accuracy.

51. The method of claim 42 wherein the facilitating of the generation of the final result for the first subtask includes receiving an indication to use a majority governs policy and automatically determining the selected number of humans to be a number corresponding to the majority of the at least some humans.

52. The method of claim 42 wherein the facilitating of the generation of the final result for the first subtask includes receiving an indication to use the specified number N for the selected number of humans, and automatically determining the selected number of humans to be N.

53. The method of claim 42 wherein the facilitating of the generation of the final result for the first subtask includes, before the determining that the received results include the common result from each of the selected number of humans, determining that a first group of multiple results received from multiple of the humans for the first subtask do not include a common result that was received from each of the selected number of humans, and sending indications of the first subtask to additional humans in order to obtain the common result from each of the selected number of humans.

54. The method of claim 42 wherein the common result received from the selected number of humans includes multiple results that are in agreement.

55. The method of claim 42 wherein the common result received from the selected number of humans includes multiple copies of a single result.

56. The method of claim 42 wherein the first subtask involves image processing.

57. The method of claim 42 wherein the first subtask involves text classification.

58. An apparatus comprising:
a storage medium having stored therein a plurality of programming instructions that are machine executable, wherein when executed, said instructions operate to:
receive indications of a first and a second subtask of a task, the first subtask associated with one or more capabilities to be used in performance of the first subtask and having associated compensation for performance of the first subtask, wherein said task is one of speech comparison, speech recognition, conversion of speech into text, and comparison of music samples;

dispatch information about the first subtask to a remote computer system of a first human for performance by said first human of the first subtask, the first human identified as having one or more capabilities that satisfy the associated capabilities for the first subtask, the dispatched information including an indication of the associated compensation for performance of the first subtask;

receive a first result from the remote computer system based on performance of the first subtask by said first human;

retrieve information about past accuracy of said first human in previously performing subtasks; and generate a result for said task based at least in part on said first result and at least in part on the past accuracy information for said first human; and a processor coupled to said storage medium to execute said instructions.

59. The apparatus of claim 58, wherein the receiving of the indications of the first and second subtasks of the task includes decomposing the task into at least the first and second subtasks.

60. The apparatus of claim 58, wherein said instructions, when executed, further operate to dispatch information about said second subtask to a distinct remote computer system of a second human for performance by the second human, receive a second result from the second human via the distinct remote computer system for said second subtask, and generate the result for said task further based on said second result.

61. The apparatus of claim 60, wherein said instructions, when executed, further operate to decompose said task into at least said first, said second, and a third subtask; perform said third subtask producing a third result; and generate the result for said task further based on said third result.

62. The apparatus of claim 58, wherein said instructions, when executed, further operate to perform said second subtask producing a second result, and generating the result for said task further based on said second result.

63. The apparatus of claim 58, wherein said first human is one of college educated, at most high school educated, at most elementary school educated, and not formally educated.

64. The apparatus of claim 58, wherein the dispatched information about said first subtask includes speech to be reviewed by the first human.

65. The apparatus of claim 58, wherein said result is one of numbers and tuples.

66. The apparatus of claim 58, wherein said task is associated with attributes that include multiple of an accuracy attribute, a security attribute, a timeout attribute, a maximum time for a task attribute, a cost per task attribute, and a maximum task cost attribute.

67. The apparatus of claim 66, wherein said instructions, when executed, further operate to dispatch information about the first subtask to multiple additional humans to perform said first subtask, and said accuracy is based at least in part on receiving results in agreement from multiple of the humans to whom the information about the subtask is dispatched.

68. The apparatus of claim 67, where said instructions, when executed, further track the accuracy of the humans.

69. The apparatus of claim 67, where said instructions, when executed, further take into consideration the accuracy of the humans when generating the result.

70. The apparatus of claim 66, wherein said security includes one of a strict security level, a lax security level, and no security.

71. The apparatus of claim 58 wherein said instructions, when executed, further operate to provide the associated compensation to the first human for the performance of the first subtask based in part on the receiving of the first result.

72. A method for a computing system to use human assistance in performing tasks, the method comprising:

receiving an indication of a first subtask to be performed, the first subtask having one or more associated criteria related to performance, wherein the first subtask involves speech comparison;

sending an indication of the first subtask to multiple humans to each perform the first subtask, each of the humans being identified as being capable of satisfying at least some of the associated criteria for the first subtask;

from each of at least some of the multiple humans, receiving a result of performance of the first subtask by the human; and automatically facilitating generation of a final result for the first subtask by, determining that the received results include a common result that was received from each of a selected number of humans, the selected number of humans being greater than 1 and based on at least one of a majority of the at least some humans and of at least a specified number N of two or more humans; and selecting the common received result as the final result for the first subtask.

73. A method for a computing system to use human assistance in performing tasks, the method comprising:

receiving an indication of a first subtask to be performed, the first subtask having one or more associated criteria related to performance, wherein the first subtask involves comparison of music samples;

sending an indication of the first subtask to multiple humans to each perform the first subtask, each of the humans being identified as being capable of satisfying at least some of the associated criteria for the first subtask;

from each of at least some of the multiple humans, receiving a result of performance of the first subtask by the human; and automatically facilitating generation of a final result for the first subtask by, determining that the received results include a common result that was received from each of a selected number of humans, the selected number of humans being greater than 1 and based on at least one of a majority of the at least some humans and of at least a specified number N of two or more humans; and selecting the common received result as the final result for the first subtask.

74. A storage medium having stored therein a plurality of programming instructions that are executable to cause a first computing system to perform a method comprising:

receiving indications of a first and a second subtask of a task, the first subtask associated with one or more capabilities to be used in performance of the first subtask and having associated compensation for performance of the first subtask, wherein said task is one of speech comparison, speech recognition, conversion of speech into text, and comparison of music samples;

dispatching information about the first subtask to a remote computer system of a first human for performance by said first human of the first subtask, the first human identified as having one or more capabilities that satisfy the associated capabilities for the first subtask;

receiving a first result from the remote computer system based on performance of the first subtask by said first human;

retrieving information about past accuracy of said first human in previously performing subtasks; and generating a result for said task based at least in part on said first result and at least in part on the past accuracy information for said first human.

75. The storage medium of claim 74, wherein said instructions, when executed, further operate to decompose the task to be performed into at least the first and second subtasks.

76. The storage medium of claim 74, wherein said instructions, when executed, further operate to dispatch an indication of said second subtask to a computing system for performance by a second human, receive a second result from the second human for said second subtask, and generate the result for said task further based on said second result.

77. The storage medium of claim 76, wherein said instructions, when executed, further operate to decompose said task into at least said first, said second, and a third subtask; perform said third subtask producing a third result; and generate the result for said task further based on said third result.

78. The storage medium of claim 74, wherein said instructions, when executed, further operate to automatically perform said second subtask producing a second result, and generate the result for said task further based on said second result.

79. The storage medium of claim 74, wherein said first human is one of college educated, at most high school educated, at most elementary school educated, and not formally educated.

80. The storage medium of claim 74, wherein said first subtask is one of text and speech.

81. The storage medium of claim 74, wherein said result is one of text, numbers, and tuples.

82. The storage medium of claim 74, wherein said task is associated with attributes that include an accuracy attribute, a security attribute, and a timeout attribute.

83. The storage medium of claim 82, wherein said instructions, when executed, further operate to dispatch said first subtask to N1−1 additional humans to perform said first subtask, and wherein said accuracy attribute includes an indication of one of majority governs and at least N2 agreed results, with N2 and N1 being integers with N1 greater than N2.

84. The storage medium of claim 82, wherein said security attribute includes an indication of one of a strict security level, a lax security level, and no security level.

85. The storage medium of claim 74, wherein said task is associated with one or more attributes, wherein the attributes indicate a maximum time to be spent on a task, a maximum cost to incur per task, and a maximum total cost for the task.

* * * * *